UNITED STATES PATENT OFFICE.

JONATHAN K. LIPPEN, OF BATTLE CREEK, MICHIGAN, ASSIGNOR TO POSTUM CEREAL COMPANY, OF BATTLE CREEK, MICHIGAN, A CORPORATION OF MICHIGAN.

SOLID SOLUBLE BEVERAGE EXTRACT AND PROCESS OF MANUFACTURING SAME.

1,338,231.  Specification of Letters Patent.  Patented Apr. 27, 1920.

No Drawing.  Application filed April 1, 1918. Serial No. 226,055.

*To all whom it may concern:*

Be it known that I, JONATHAN K. LIPPEN, a citizen of the United States of America, and a resident of Battle Creek, Michigan, have invented a new and useful Improvement in Solid Soluble Beverage Extracts and Processes of Manufacturing Same, which invention is fully set forth in the following specification.

This invention relates to a beverage extract and the method of making the same, and has for its object to provide an extract of the above character from grain sorghums, such as Kafir corn, milo maize or feterita. These extracts, when reduced to a solid form, I have discovered can be quickly dissolved in hot water to produce a healthful and palatable drink in lieu of coffee or other tannin containing beverages.

Heretofore, wheat has entered largely into the composition of the starting materials for the preparation of cereal coffee extracts, such as that described in U. S. Patent No. 1,031,962 to Willis H. Post, but the demands for this cereal and the necessity of conserving it make it desirable to seek a wheat substitute in making beverage extracts. I have discovered that certain grain sorghums, such as those mentioned above, may replace wheat in large part, if not entirely, and, under proper treatment, yield beverage extracts which are equal to, if not superior to, those made from wheat.

In order that my invention may be readily understood, I shall describe the same, by way of example, as applied to the preparation of a solid soluble beverage extract from a roasted composition containing feterita, one of the non-saccharine grain sorghums. While I prefer to use feterita for this purpose, other grain sorghums such as Kafir corn and milo maize may be used. Mixtures of grain sorghums may also be employed. The proportions of the ingredients herein given for preparing the roasted composition are illustrative and may be varied within fairly wide limits. The parts are given by weight.

|  | Parts. |
|---|---|
| Feterita flakes | 28 |
| Feterita flour dextrinized | 28 |
| A mixture of dextrinized wheat flour and barley malt flour (9 parts of the former to 1 part of the latter) | 10 |
| Rye middlings | 14 |
| New Orleans molasses | 20 |

In some cases, other cereal flour may be substituted for the wheat flour, but I prefer to use a small quantity of wheat flour as indicated above.

In practising the invention, the feterita grains are steeped for about thirty minutes in lime water and, after draining, are allowed to stand from twelve to fifteen hours, and are then passed through ordinary flaking rolls. The flakes are then screened whereby about 50% by weight of the feterita separates as flour. This flour is subjected to dry heat at a dextrinizing temperature, thereby converting most of the starch into dextrin. The wheat flour and barley malt flour are also dextrinized in a like manner. The dextrinized feterita flour, feterita flakes, rye middlings, and dextrinized wheat and barley malt flour are thoroughly mixed with the molasses, and water added if desired, and cooked for about twenty minutes, preferably under about 15 lbs. pressure, in order to gelatinize any remaining starch. The mass is dried while being stirred and then roasted, the temperature being carried to thorough caramelization. The step of dextrinizing converts the larger part of the starches into readily soluble compounds, while the step of cooking gelatinizes any starch which escaped the dextrinizing operation. These steps combined enable all the starch contents of the cereal to enter a fluid condition and disseminate over the bran of the middlings and other insoluble particles, and thus produce a substantially uniform mixture and enable the roasting operation to be effected in shorter time and with more uniform results, while avoiding unsatisfactory dextrinizing and charring of fine particles of starch which would otherwise be present. The step of cooking may be effected as a part of the roasting operation. The mixture naturally contains considerable water (20% to 25%), and, if it is placed in the roaster and heated up to the roasting temperature, cooking will take place during the preliminary heating and a homogeneous mixture will be produced.

It is to be here noted that the steps of dextrinizing the grain or cereal product and heating it in the presence of moisture to gelatinize any unconverted starch prior to roasting, are applicable not only to the specific cereals taken as an illustration but may be applied to any grains or cereals which are to be treated for making beverage extracts.

Having prepared the roasted products from which it is desired to make the solid extract, I next treat the product with water to dissolve out its soluble constitutents. Either a part or all the soluble constituents may be removed, thereby securing different characteristics in respect to flavor, aroma, and the like in the product. The extraction may be effected by treating the roasted product with either cold or warm water, or by boiling the same therewith, but I prefer to use percolation with boiling water, thereby obtaining a solution which readily filters clear. Furthermore, percolation permits control of the extraction whereby extracts of different strength and qualities may be prepared, if desired. This aqueous extract is a palatable, healthful and highly nutritious beverage and may be used as such. I have discovered, however, that this aqueous extract may be reduced to a solid extract, which solid extract is almost instantly soluble in hot water and does not lose any of its original flavor. While the aqueous extract from the roasted products, prepared as above described, may and sometimes does yield as high as 50% in soluble extractive matter, and makes an excellent beverage, yet an extract of 30% possesses in a marked degree the desirable properties of the roasted product. No particular apparatus for percolating need be described, as it forms no part of the present invention, such devices being well known and on the market. In making this solid soluble extract, the clear aqueous solution is concentrated by evaporation. This operation is preferably conducted *in vacuo*, such as obtained in a vacuum evaporation pan, and with care to prevent loss of volatile matters other than water. While the temperature in the vacuum pan may vary within considerably wide limits during the early stages of evaporation, a temperature in the neighborhood of 50° C. has been found satisfactory. This operation is continued until the aqueous extract is concentrated to a point where it contains from about 30 to 50% solids in solution. The strength of this extract will vary somewhat according to the plan adopted for the final drying, which may be conducted on trays in a vacuum chamber or a rotary drum *in vacuo*. Open evaporation and drying is not advisable. In case a vacuum pan is used for the final evaporation, the aqueous extract may be concenterated to the point of containing about 30 to 50% solids. It is obvious that the same pans as used for concentration may be used for drying, though it is preferable to transfer the concentrate to new pans. While water to considerable extent is present in the mass, no further precautions are needed as to temperature than those taken during the initial evaporation. When, however, the moisture is reduced to a low per cent., the temperature should be so regulated that overheating of the product does not occur. A temperature of about 60° C. has been found to be safe for this purpose. At the very end of drying, and while traces of water still remain, the temperature may be and preferably is lowered, permitting the heat of the mass to drive off the last portions while cooling. The product is scraped or otherwise removed from the pan, and coarsely granulated or ground, as desired. For reasons noted above, the granular condition is preferred. In the event that film evaporation is practised with a revoluble drum in a vacuum chamber, the first concentration or density of the aqueous extract is adjusted to the requirements of the particular drum apparatus employed, such as in matters of surface exposed, speed of rotation, temperature, etc. In general, however, the fluid extract may have a strength of about 45% when applied to the drum. In drying the extract on a drum, it is particularly desirable to remove the solid mass from the drum surface before complete dryness is attained, to avoid overheating the product, the heat retained by the mass being relied on to remove the last portions of moisture while the product is still inside the vacuum chamber. The dried extract is comminuted preferably in a coarse granular form, and is ready for packing. By comminuted I intend to include the condition of the extract in the form of grains, powder, flakes or other subdivided form assumed by the dry extract.

The resulting product is a beverage extract in granular or comminuted form, and of extreme solubility in water, either hot or cold, and when a level teaspoonful of the extract is dissolved in a cup of hot water, solution is effected in one minute or less, and produces a beverage having the pleasant blended flavors of the original roasted materials. The dry extract, while varying somewhat in color, is usually amber brown to black, and is semi-transparent on the fractured edges of the granules when they are prepared as above described.

In lieu of the New Orleans molasses mentioned in the illustrative example, sugar, syrup, (cane or glucose), and even sugar-containing fruits such as figs, prunes and the like may be employed. In lieu of rye middlings which contain bran, other equivalent bran material, such as bran of wheat or other cereals may be used, but I find that rye middlings give the best results.

What is claimed is:—

1. A solid soluble beverage extract of a roasted mixture including saccharine material, a dextrinized grain-sorghum product, and rye middlings.

2. A solid soluble beverage extract of a roasted mixture including saccharine material, a dextrinized product of feterita grain, and rye middlings.

3. A solid soluble beverage extract of a roasted mixture including saccharine material, flaked feterita, dextrinized feterita flour, and rye middlings.

4. A solid soluble beverage extract of a roasted mixture including saccharine material, flaked grain-sorghum, a dextrinized grain-sorghum flour, and rye middlings.

5. A solid soluble beverage extract of a roasted mixture of New Orleans molasses, flaked feterita, dextrinized feterita flour, dextrinized wheat and barley malt flours, and rye middlings.

6. A solid soluble beverage extract of a roasted mixture containing New Orleans molasses, dextrinized feterita flour, wheat and barley malt flours, and rye middlings.

7. The process of making a solid soluble beverage extract consisting in flaking feterita grains, separating from the flakes a part of the flour and dextrinizing the latter, mixing therewith the flake portion, dextrinized wheat and barley malt flours, rye middlings and New Orleans molasses, heating the mixture in the presence of the contained moisture of the molasses, then roasting the product at a caramelizing temperature, extracting the roasted product with water, and evaporating the fluid extract to a solid.

8. The process of making a solid soluble beverage extract consisting in flaking a grain sorghum, separating from the flakes a portion of the flour and dextrinizing the latter, mixing said dextrinized flour and flakes, a saccharine material, dextrinized wheat and barley malt flours and rye middlings, heating the mixture in the presence of moisture, then roasting the product at a caramelizing temperature, extracting the latter with water, and evaporating the fluid extract to a solid.

9. The process of making a solid soluble beverage extract consisting in dextrinizing a grain sorghum flour, mixing therewith a saccharine material, dextrinized wheat and barley malt flours and rye middlings, heating the mixture in the presence of moisture, then roasting the mixture at a caramelizing temperature, extracting the product with water and evaporating the fluid extract to a solid.

10. In the manufacture of a cereal beverage from grains or cereals, the process which consists in subjecting the grain or cereal product to a dextrinizing temperature and then cooking the same in the presence of moisture, and then roasting the same.

In testimony whereof I have signed this specification.

JONATHAN K. LIPPEN.